United States Patent [19]

Stachuletz

[11] Patent Number: 4,459,048
[45] Date of Patent: Jul. 10, 1984

[54] OIL FILM BEARING

[75] Inventor: Manfred Stachuletz, Duesseldorf, Fed. Rep. of Germany

[73] Assignee: Mannesmann Aktiengesellschaft, Duesseldorf, Fed. Rep. of Germany

[21] Appl. No.: 448,957

[22] Filed: Dec. 13, 1982

[30] Foreign Application Priority Data

Dec. 19, 1981 [DE] Fed. Rep. of Germany ....... 3150496

[51] Int. Cl.$^3$ .............................................. F16C 33/10
[52] U.S. Cl. .................... 384/291; 384/100
[58] Field of Search ................ 384/99, 118, 100, 123, 384/107, 286, 110, 287, 111, 291, 112, 322, 114, 397, 398

[56] References Cited

U.S. PATENT DOCUMENTS

| | | | |
|---|---|---|---|
| 2,660,484 | 11/1953 | Gerard et al. | 384/118 |
| 3,131,785 | 5/1964 | Blank | 384/291 X |
| 4,105,267 | 8/1978 | Mori | 384/291 |
| 4,159,152 | 6/1979 | Bjork | 384/100 X |

Primary Examiner—Stuart S. Levy
Assistant Examiner—David Werner
Attorney, Agent, or Firm—Schwartz, Jeffery, Schwaab, Mack, Blumenthal & Koch

[57] ABSTRACT

Where oil film bearings are used on rolling mill rolls provided with conical roll necks, the bearing bush being interference fitted to the roll neck to rotate along with the roll neck, adhesive friction may cause contact corrosion between the bearing bush and the roll neck. To prevent such detriment, the oil grooves are machined slopingly into the conical inner surface of the rotating bearing bush in order to permit creep oil issuing from the oil grooves during operation to spread over ungrooved rotational partial surfaces by the effect of the centrifugal force. The lubricating oil is supplied to the oil grooves through bores distributed on the circumference of the bush by contact with the compressed oil film present between the cylindrical outside surface of the rotating bearing bush and the fixed bearing bush on the roll chock.

5 Claims, 5 Drawing Figures

OIL FILM BEARING

BACKGROUND OF THE INVENTION

The invention relates to an oil film bearing for use on the conical neck of a rolling mill roll, the roll neck being provided with a conical bush disposed to rotate along with the rolling mill roll, the bush, in turn, being fitted to a fixed cylindrical bearing bush inserted in the roll chock, in which case the high-pressure oil film building up between the fixed and rotating bushes effects lubrication of the transition zone between the conical roll neck and the rotating bearing bush by way of supply bores machined radially into the rotating bush, in that the oil is forced to flow into oil grooves distributed on the circumference of the rotating bush and extending in the axial direction of the bush.

To simplify and facilitate removal of the rotating bush from the roll neck where such oil film bearings are used, the interference fit between the conical surfaces is generally maintained relatively moderate, in other words, less tight. Therefore, a certain amount of relative movement may occur between the rotating bearing bush and the rotating roll neck in operation under load and, unless proper lubrication is provided between the fitted conical surfaces, this will result in contact corrosion by the adhesive friction between the roll neck and the bush, ultimately leading to heavy friction wear and to the so-called "black spots". In serious cases, the rotating bearing bush and/or the roll neck may actually become permanently damaged.

A known method of preventing these detrimental phenomena (DE-OS 2 843 658) is to add secondary oil grooves to the existing primary oil grooves and to interconnect these grooves by connecting grooves, to form several separate networks of grooves distributed on the circumference of the conical bushes, which will successively receive high-pressure oil through the supply bores as each of these networks of grooves rotates through the load zone of the bearing. The object is to improve lubrication by increasing the oil supply to the transition zone between the roll neck and the rotating bearing bush of the oil film bearing.

Apart from the very high costs involved in manufacturing such networks of grooves, a great number of partial surfaces on the bush and the roll neck still lack reliable lubrication despite the more extensive distribution of oil through the primary, secondary and interconnecting grooves, since lubrication is essentially limited to the areas of the actual groove networks, whilst the areas between the networks will, at most, receive a slight sweep of straying and not selectively controllable creep oil.

Thus, the object of the invention is to avoid the foregoing disadvantages and to dispose the oil grooves in the rotating conical bearing bush in a manner to permit comprehensive oil distribution for prevention of contact corrosion between the conical roll neck and the bush fitted thereto.

SUMMARY OF THE INVENTION

According to the invention, this problem may be solved by positioning the oil grooves at a slope to the inner generating lines of the rotating bush, the sloping position of the oil grooves permitting oil to spread onto the ungrooved rotational partial surfaces of the bush as creep oil is caused to issue from the oil grooves by the centrifugal force generated when the roll rotates. This is based on the knowledge that roll rotation will let oil issue from the oil grooves, that is, the centrifugal force will direct the oil towards the generating lines of the bush or bearing. Conversion of this knowledge provides that sufficiently sloping oil grooves will let the creep oil issuing in the direction of the generating line come into contact with the ungrooved rotational partial surfaces and, thus, ensure lubrication in these areas as well. In the present case, the bush is advantageously provided with twelve oil grooves distributed on its circumference and, with this number of grooves, each groove is positioned at a slope of 18° to its associated generating line on the bush. Enlargement of this angle at the same number of oil grooves will even cause creep oil flow to partially overlap.

In a refinement of the invention, the bush is provided with a second series of oil grooves sloping at an angle equal to that of the first series, but extending in the opposite direction, whereby the second oil grooves intersect the first grooves. This gives consideration to the fact that the bush may either be subjected to right- or lefthand revolutions of the roll neck, depending on whether the upper or the lower roll is involved. The intersecting oil grooves are to counteract any axial movement occurring in the two directions of rotation and, thus, prevent the rather moderate interference fit between the roll neck and the bush from working loose.

According to a further embodiment of the invention, the location of the radial supply bores is limited to the thick portion of the conical bush. The advantage of this proposal is that the oil groove arrangement need not be provided with additional throttle grooves in order to prevent the oil feeding into the oil grooves from escaping through the bores otherwise present in the thin portion of the bush.

BRIEF DESCRIPTION OF THE DRAWINGS

The subject of the invention will now be more closely described, with the aid of the examples shown in the drawings.

DETAILED DESCRIPTION OF THE PREFERRED EMBODIMENTS

Figure 1:
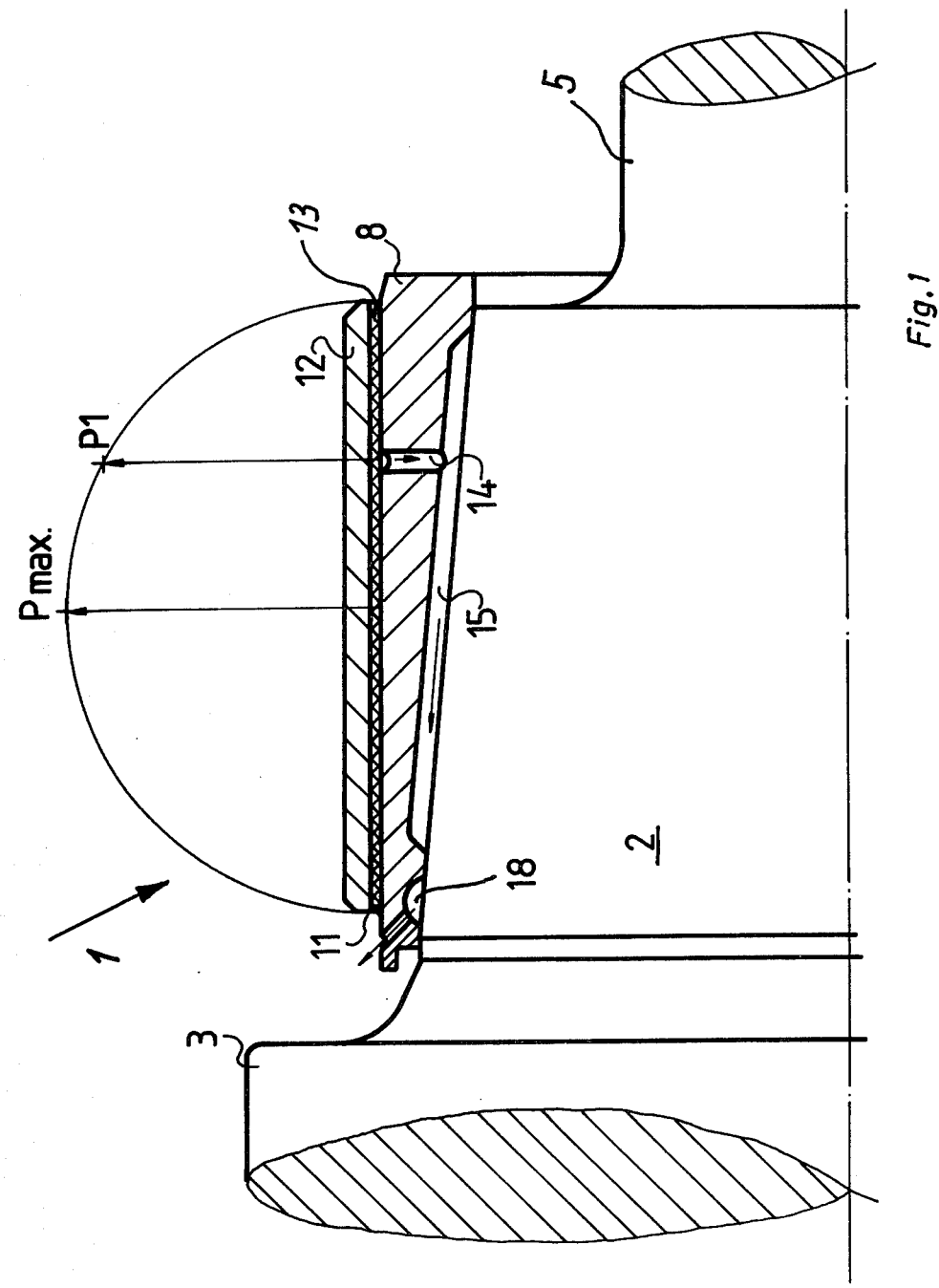
FIG. 1 is a view, partially in cross section, of the roll neck extension of a rolling mill roll, with its conical neck portion supported in the rotating and fixed bush of an oil film bearing not shown.
Figure 2:
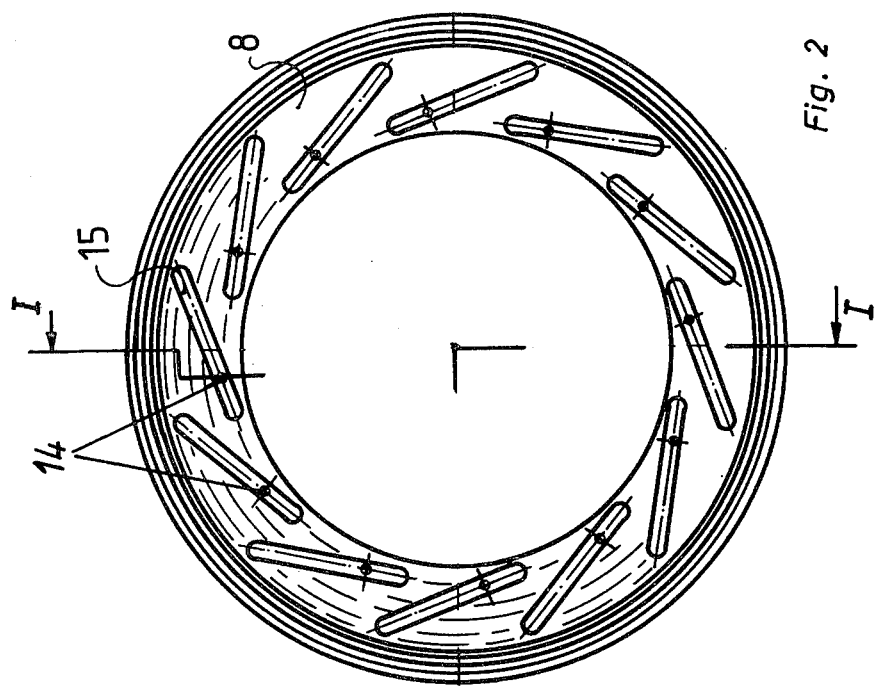
FIG. 2 is a view of the inventive conical neck bush in the axial direction.

The roll neck extension 1 of a rolling mill roll as shown in FIG. 1 is provided with a conical roll neck section 2 extending from the roll body 3 to a smaller diameter section 5. The oil film bearing of known make, not shown in closer detail, includes a conical bearing bush 8 which is fitted to the conical section 2 of the roll neck extension 1 and keyed into place by means not shown. It goes without saying that the oil film bearing is provided with further securing means for the bearing bush 8. The cylindrical circumferential area 11 of the bush 8 rotating with the roll neck, is mounted in a bearing bush 12 supported in a fixed position in the roll chock and is capable of rotating in the fixed bearing bush. During operation, oil is constantly fed to the area between the fixed bearing bush 12 and the rotating bearing bush 8, which hydrodynamically produces a high-pressure oil film 13 in the load or load pick-up zone of the oil film bearing. Since the interference fit between the conical neck 2 and the rotating bush 8 is relatively moderate, slight relative movements will occur between these parts (during load operation of the mill stand). Therefore, to prevent wear, there is also need for lubrication in the transition zone between the conical roll neck and the rotating bush. To accomplish this, a partial amount of the oil in compression in the load zone is fed into a series of oil grooves 15 through supply bores 14 distributed on the circumference of the rotating bush 8 and machined into the bush in the radial direction.

Figure 3:
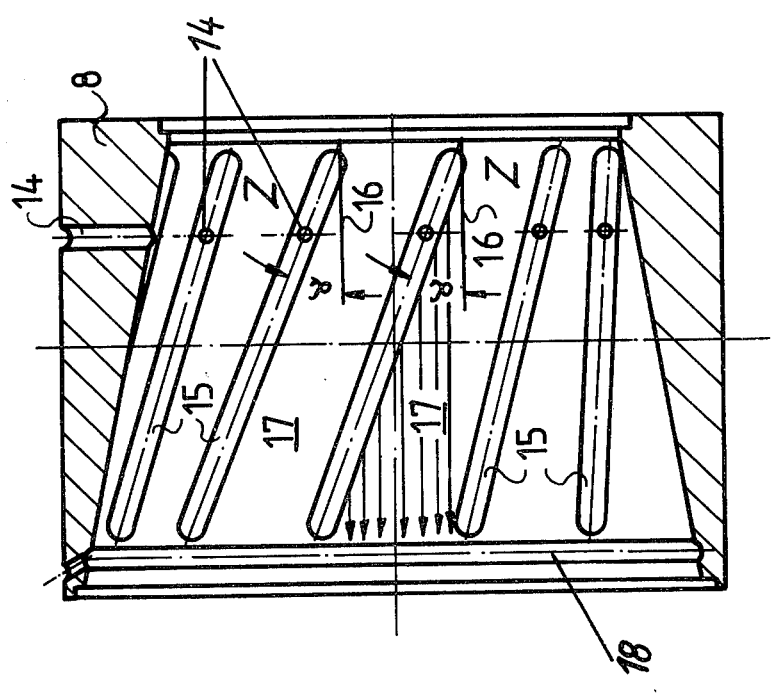
FIG. 3 is a section through line I—I in FIG. 2.

The oil grooves 15 are located in the conical inner surface of the rotating bush 8 and positioned to slope at a certain angle α to the inner generating lines 16 of the bush (FIG. 3). As the roll accelerates, the centrifugal force increases, causing creep oil to issue from the oil grooves 15. The centrifugal force will be acting in the direction of the generating lines, so that oil will disperse in this direction as well and (as illustrated by arrows in FIG. 3) also wet the ungrooved partial surfaces 17 of the bush 8. At the end of the conical roll neck section 2 towards the roll body 3, the oil is collected in a groove 18 and is returned to the oil circuit. Oil delivery by the centrifugal force will not cover the partial areas of the bush 8 designated Z in FIG. 3 and FIG. 5 which, however, will not have any detrimental effect, since the pressures in these areas are relatively low as shown by the pressure curve in FIG. 1. In fact, in practice the really dangerous "black spots" have been found to develop merely in the area of the highest load P max., approximately in the center of the bearing. On the other hand, the supply bores 14 cannot be placed optionally towards the outside, since the pressure P 1 present at the radial plane of the bores 14 is required to be sufficiently high to let the oil reach the oil grooves 15, 19 between the neck 2 and the bush 8.

Figure 4:
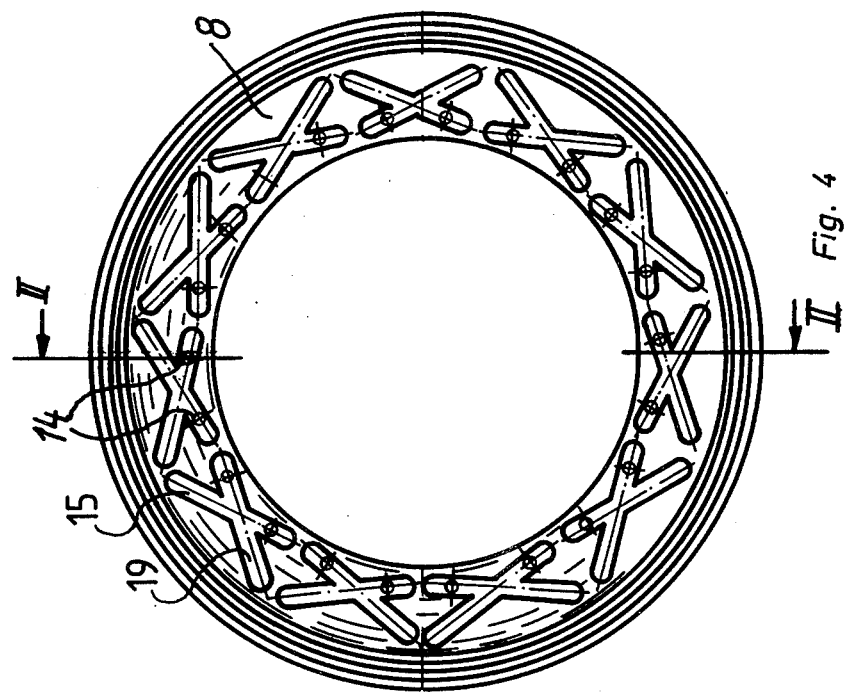
FIG. 4 is a conical neck bush shown in the axial direction, with oil grooves intersecting according to the invention.
Figure 5:
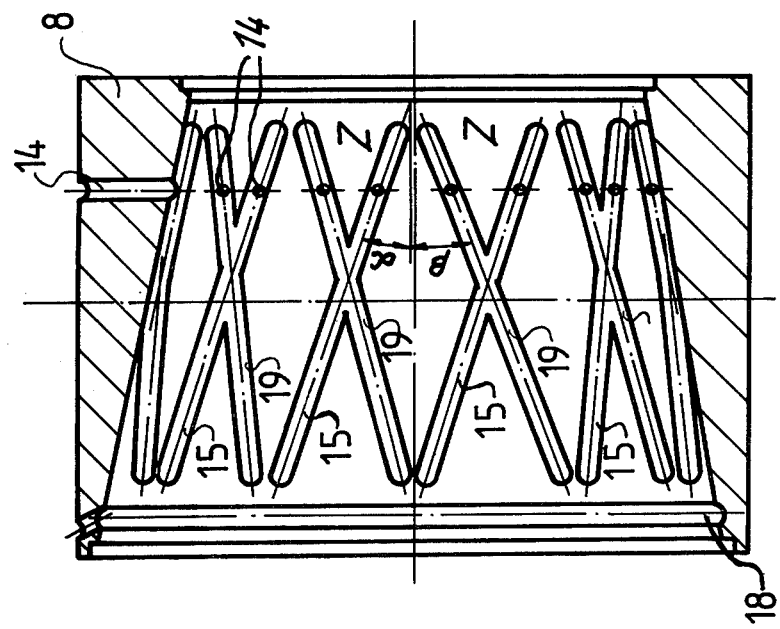
FIG. 5 is a section through line II—II in FIG. 4.

In the example shown in FIGS. 4 and 5, a second series of oil grooves 19 is machined into the conical surface of the rotating bush 8, in addition to the first series 15. These oil grooves 19 are also positioned at a slope, but extend in the opposite direction of the grooves 15. Referred to the generating line 16, the angle β is absolutely identical with the angle α of the first series of grooves, so that the grooves 15, 19 intersect in the conical plane of the bush 8.

What is claimed is:
1. An oil film bearing for a rolling mill roll having a conical neck with a thick diameter portion and a thin diameter portion, said bearing comprising:
   a sleeve having a conical inner surface disposed around said neck for rotation with said neck;
   an outer bearing bush mounted on said sleeve such that said sleeve rotates relative to said outer bearing bush;
   oil grooves machined into said sleeve, said grooves being distributed on said conical inner surface of said sleeve and extending along said conical inner surface;
   oil supply bores machined radially through said sleeve into said oil grooves to permit pressurized oil present between said sleeve and said outer bearing bush to be forced into said oil grooves to prevent contact corrosion arising from adhesive friction between said sleeve and said roll neck, said oil supply bores being formed in said sleeve at a position closer to said thin diameter portion of said roll neck than to said thick diameter portion of said roll neck whereby oil issuing from said grooves is urged along generating lines on said roll neck by centrifugal forces generated by said conical shape of said roll neck when said roll rotates, said oil supply bores being spaced from the ends of said sleeve so as to be positioned in a higher pressure area of said oil present between said sleeve and said outer bearing bush such that said oil is under sufficient pressure to reach said grooves,
   said oil grooves being positioned at a substantial slope to said generating lines so as to spread oil issuing from said grooves as creep oil over large portion of the ungrooved surface of said rotating sleeve in the direction of said thicker diameter portion of said roll neck when said roll rotates.

2. An oil film bearing according to claim 1 including a second series of oil grooves sloping at an angle identical to the angle of said first mentioned grooves but in an opposite direction whereby the second series of grooves intersect said first mentioned grooves.

3. An oil film bearing according to claim 1 wherein said sleeve has a cylindrical outer surface and said outer bearing bush is cylindrical.

4. An oil film bearing according to claim 1 wherein said slope is at an angle less than 90 degrees.

5. An oil film bearing according to claim 1 wherein said grooves overlap adjacent grooves when viewed in the axial direction of said sleeve.

* * * * *